United States Patent
Miyazawa

(10) Patent No.: US 8,803,983 B2
(45) Date of Patent: Aug. 12, 2014

(54) IMAGE STABILIZATION APPARATUS, CONTROL METHOD THEREFOR, OPTICAL APPARATUS AND IMAGE CAPTURING APPARATUS

(71) Applicant: Canon Kabushiki Kaisha, Tokyo (JP)

(72) Inventor: Hitoshi Miyazawa, Kuki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/693,505

(22) Filed: Dec. 4, 2012

(65) Prior Publication Data

US 2013/0162847 A1 Jun. 27, 2013

(30) Foreign Application Priority Data

Dec. 21, 2011 (JP) .................................. 2011-280243

(51) Int. Cl.
 *H04N 5/228* (2006.01)
 *G03B 17/00* (2006.01)
 *H04N 5/232* (2006.01)

(52) U.S. Cl.
 CPC ................................ *H04N 5/23287* (2013.01)
 USPC ...................................... 348/208.11; 396/55

(58) Field of Classification Search
 CPC .......... H05N 5/23248; H05N 5/23251; H05N 5/23258; H05N 5/23264; H05N 5/2328; H05N 5/23287
 USPC ................. 348/208.2, 208.7, 208.11
 See application file for complete search history.

(56) References Cited

U.S. PATENT DOCUMENTS

| | | | | |
|---|---|---|---|---|
| 5,649,237 | A * | 7/1997 | Okazaki | 348/208.2 |
| 7,634,178 | B2 * | 12/2009 | Washisu | 348/208.2 |
| 8,199,206 | B2 * | 6/2012 | Tabuchi | 348/208.4 |
| 8,279,290 | B2 * | 10/2012 | Yamanaka | 348/208.11 |
| 8,305,455 | B2 * | 11/2012 | Washisu et al. | 348/208.4 |
| 8,400,516 | B2 * | 3/2013 | Yamada et al. | 348/208.7 |
| 8,605,159 | B2 * | 12/2013 | Nishiyama | 348/208.4 |
| 2002/0097993 | A1 * | 7/2002 | Imada | 396/55 |
| 2008/0309772 | A1 * | 12/2008 | Ikeda | 348/208.7 |
| 2010/0079604 | A1 * | 4/2010 | Washisu | 348/208.4 |
| 2011/0176012 | A1 * | 7/2011 | Yagisawa | 348/208.2 |
| 2012/0092511 | A1 * | 4/2012 | Wakamatsu | 348/208.2 |
| 2013/0163084 | A1 * | 6/2013 | Miyazawa | 359/554 |
| 2013/0300881 | A1 * | 11/2013 | Washisu et al. | 348/208.2 |

FOREIGN PATENT DOCUMENTS

| | | |
|---|---|---|
| JP | 07-225405 | 8/1995 |
| JP | 2006195178 A * | 7/2006 |
| JP | 2010-025962 | 2/2010 |
| JP | 2012088465 A * | 5/2012 |

\* cited by examiner

*Primary Examiner* — John Villecco
(74) *Attorney, Agent, or Firm* — Cowan, Liebowitz & Latman, P.C.

(57) ABSTRACT

An image stabilization apparatus comprises: an image stabilization unit that reduces image blur due to a shake by moving a driven unit; a calculation unit that estimates the shake based on a position of the driven unit and a driving force applied to the driven unit and that calculates a translational shake correction amount based on the estimated shake; and a driving unit that drives the driven unit of the image stabilization unit based on the translational shake correction amount. When the driven unit is at a position away from a center of a range of movement of the driven unit, the calculation unit sets the translational shake correction amount to be smaller than that when the driven unit is at the center of the range of movement.

16 Claims, 16 Drawing Sheets

F I G. 11
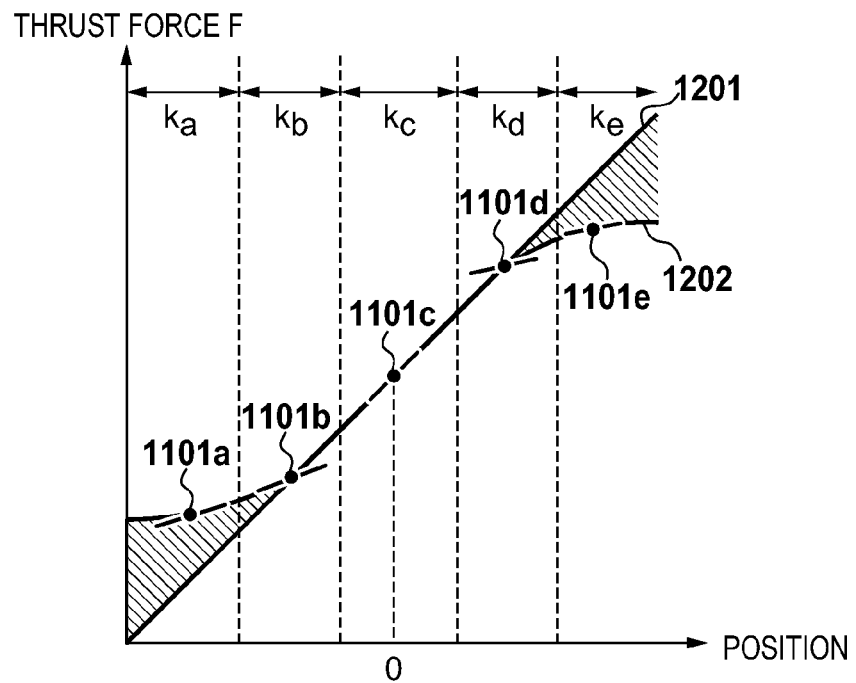
F I G. 12
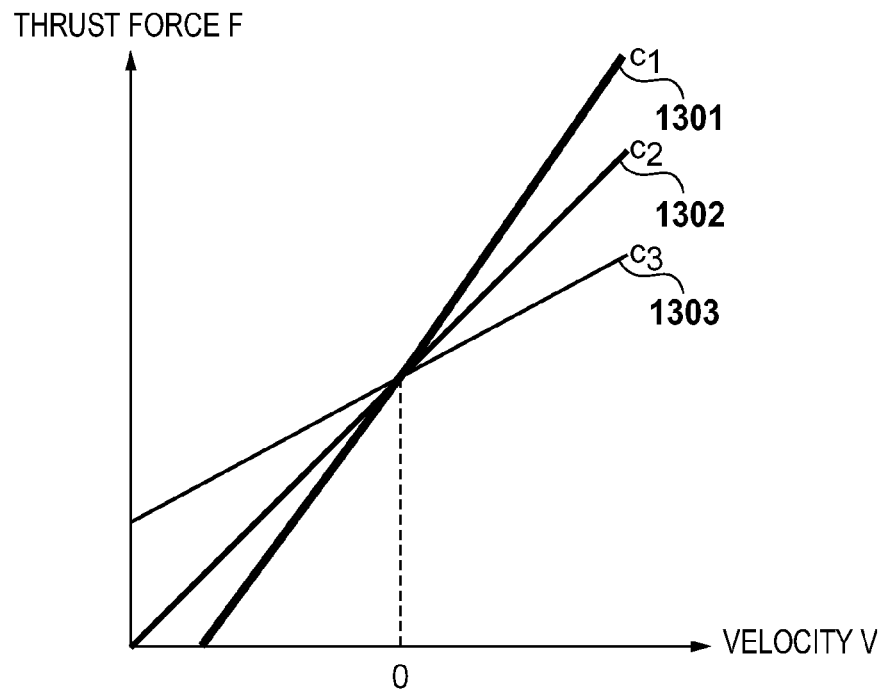

IMAGE STABILIZATION APPARATUS, CONTROL METHOD THEREFOR, OPTICAL APPARATUS AND IMAGE CAPTURING APPARATUS

BACKGROUND OF THE INVENTION

1. Field of the Invention

The present invention relates to an image stabilization apparatus and control methods for such an image stabilization apparatus, an optical apparatus, and an imaging apparatus that compensate image blur (image degradation) caused by shakes such as handshakes.

2. Description of the Related Art

At present, cameras provided with image stabilization apparatuses that prevent image blur caused by handshakes and are configured with, for example, a shake compensation unit, a driving unit, and a shake detection unit are in commercial production, and as a result, user-caused shooting mistakes are decreasing.

As an example of an image stabilization apparatus, an apparatus that detects rotational shakes by using an angular velocity sensor and moves a part of the lens or an image sensor so as to reduce image blur on the image sensor surface is incorporated in various optical apparatuses as an effective image blur correcting function. However, in close-range shooting or high-magnification ratio shooting, image degradation caused by so-called "translational shakes (parallel shakes)", which are applied in a parallel or perpendicular direction to the optical axis of the camera and cannot be detected by an angular velocity sensor alone, cannot be ignored.

Here, a description will be given of a conventional camera incorporating an image stabilization apparatus that performs image blur correction by detecting rotational shakes and translational shakes, with reference to FIGS. 1 and 2. FIG. 1 is a diagram illustrating shake directions of a camera 101, and FIG. 2 is a diagram showing the top view of the camera 101 and an image stabilization processing unit provided in a camera CPU 106 incorporated in the camera 101. The image stabilization system incorporated in the camera 101 performs correction on the shakes (hereinafter referred to as rotational shakes) indicated by arrows 103$p$ and 103$y$ and on the shakes (hereinafter referred to as translational shakes) indicated by arrows 104$p$ and 104$y$, with respect to an optical axis 102.

The camera 101 also includes a release button 105, the camera CPU 106, an image sensor 107, an angular velocity sensor 108 that detects the rotational shakes 103$p$ and 103$y$, an acceleration sensor 109 that detects the translational shakes 104$p$ and 104$y$, a driving unit 110 and an image stabilization mechanism 111. The driving unit 110 causes the image stabilization mechanism 111 to drive a correction lens so as to perform image stabilization taking both rotational shakes and translational shakes into account.

An angular velocity signal from the angular velocity sensor 108 and an acceleration signal from the acceleration sensor 109 are input into the camera CPU 106. In the camera CPU 106, a rotational shake correction amount calculation unit 106$a$ calculates a rotational shake correction amount, and a translational shake correction amount calculation unit 106$b$ calculates a translational shake correction amount. The calculated rotational shake correction amount and translational shake correction amount are summed together (combined) by an addition unit 112. Image stabilization is then performed based on the correction amount obtained in the above-described manner.

Japanese Patent Laid-Open No. 7-225405 discloses a technique where an acceleration sensor that detects acceleration is provided, translational shakes (parallel shakes) are found from a second-order integral of the acceleration obtained by the acceleration sensor, and a shake compensation unit is driven based on the translational shake and the output of a separate angular velocity sensor.

However, the output of the acceleration sensor used to detect translational shakes is susceptible to environmental changes such as noise from disturbances, changes in temperature, and so on, and because such unstable factors are exacerbated by taking the second-order integral, there is a problem in that highly-precise translational shake compensation is difficult to achieve.

Meanwhile, Japanese Patent Laid-Open No. 2010-25962 discloses handling translational shakes as rotational shakes when the center of rotation is located in a position that is distant from the camera. With this method, an angular velocity sensor and an acceleration sensor are provided, and shake compensation is carried out by finding a compensation value and an angle using the radius of rotation of the rotational shake based on the output from the sensors; through this, a center of rotation that is limited to a frequency band unsusceptible to disturbances is found. Doing so makes it possible to reduce unstable factors in the acceleration sensor as described above.

However, the method for performing translational shake correction has the following problems. The first problem is that, in order to perform translational shake correction, it is necessary to provide a translational shake detection sensor, but if, for example, an acceleration sensor is used as the translational shake detection sensor, it may cause an increase in the size of the camera and the cost. Another problem is that it is desirable to attach the acceleration sensor to the lens principal point position, but it is difficult to provide an acceleration sensor near the lens principal point position.

Japanese Patent Laid-Open No. 2010-25962 discloses a method in which, in order to detect translational shakes, the shakes are detected based on output from an image sensor, instead of an acceleration sensor. In the case of detecting shakes based on output from an imaging unit, a method is used in which a correction coefficient is calculated based on a relationship between image blur and rotational shakes immediately before a photographing operation and correction is performed on rotational shakes during the photographing operation. In this case, however, a problem arises in that the translational shake correction can be performed only during a photographing operation. In moving image shooting, control is possible by electric image stabilization in which a correction coefficient is obtained based on the relationship between image blur and rotational shakes, the obtained correction coefficient is multiplied by rotational shakes to calculate a translational shake amount, and the position of an area clipped from an image formed on the image sensor is changed according to the calculated translational shake amount. This, however, also causes problems in which an angle of view is narrowed due to clipping of a part of an image.

Japanese Patent Laid-Open No. 2010-25962 also discloses the use of, as a shake detection unit, a unit that detects acceleration of translational shakes based on current generated in a driving coil, instead of an acceleration sensor. However, with the unit that detects acceleration of translational shakes based on current generated in a driving coil, it is not possible to perform image stabilization control until immediately before a photographing operation. In the case where the influence of translational shakes is large such as in the case of macrophotography, it may be difficult to set a fine configuration or achieve accurate focus. There is also another problem in that during moving image shooting, the translational shake correction cannot be performed. Also, the acceleration estimation using a coil current value does not give consideration to the characteristics of the image stabilization mechanism, and therefore it is difficult to perform accurate acceleration estimation, and the use of estimated acceleration in image stabilization presents a problem with the accuracy of estimation.

SUMMARY OF THE INVENTION

The present invention has been made in consideration of the above situation, and the present invention is to perform highly accurate translational shake correction while achieving down-sizing and cost reduction in an image stabilization apparatus.

According to the present invention, provided is an image stabilization apparatus comprising: an image stabilization unit that reduces image blur due to a shake by moving a driven unit; a calculation unit that estimates the shake based on a position of the driven unit and a driving force applied to the driven unit and that calculates a translational shake correction amount based on the estimated shake; and a driving unit that drives the driven unit of the image stabilization unit based on the translational shake correction amount, wherein when the driven unit is at a position away from a center of a range of movement of the driven unit, the calculation unit sets the translational shake correction amount to be smaller than that when the driven unit is at the center of the range of movement.

According to the present invention, provided is a method for controlling an image stabilization apparatus including an image stabilization unit that corrects image blur due to a shake by moving a driven unit, the method comprising: estimating the shake based on a position of the driven unit and a driving force applied to the driven unit and calculating a translational shake correction amount based on the estimated shake; and driving the driven unit of the image stabilization unit based on the translational shake correction amount, wherein when the driven unit is at a position away from a center of a range of movement of the driven unit, the translational shake correction amount is set to be smaller than that when the driven unit is at the center of the range of movement.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 11 is a diagram showing the characteristics of a spring constant of the image stabilization mechanism according to the first embodiment;

FIG. 12 is a diagram showing the characteristics of a damping coefficient of the image stabilization mechanism according to the first embodiment;

DESCRIPTION OF THE EMBODIMENTS

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

First Embodiment

Figure 2:
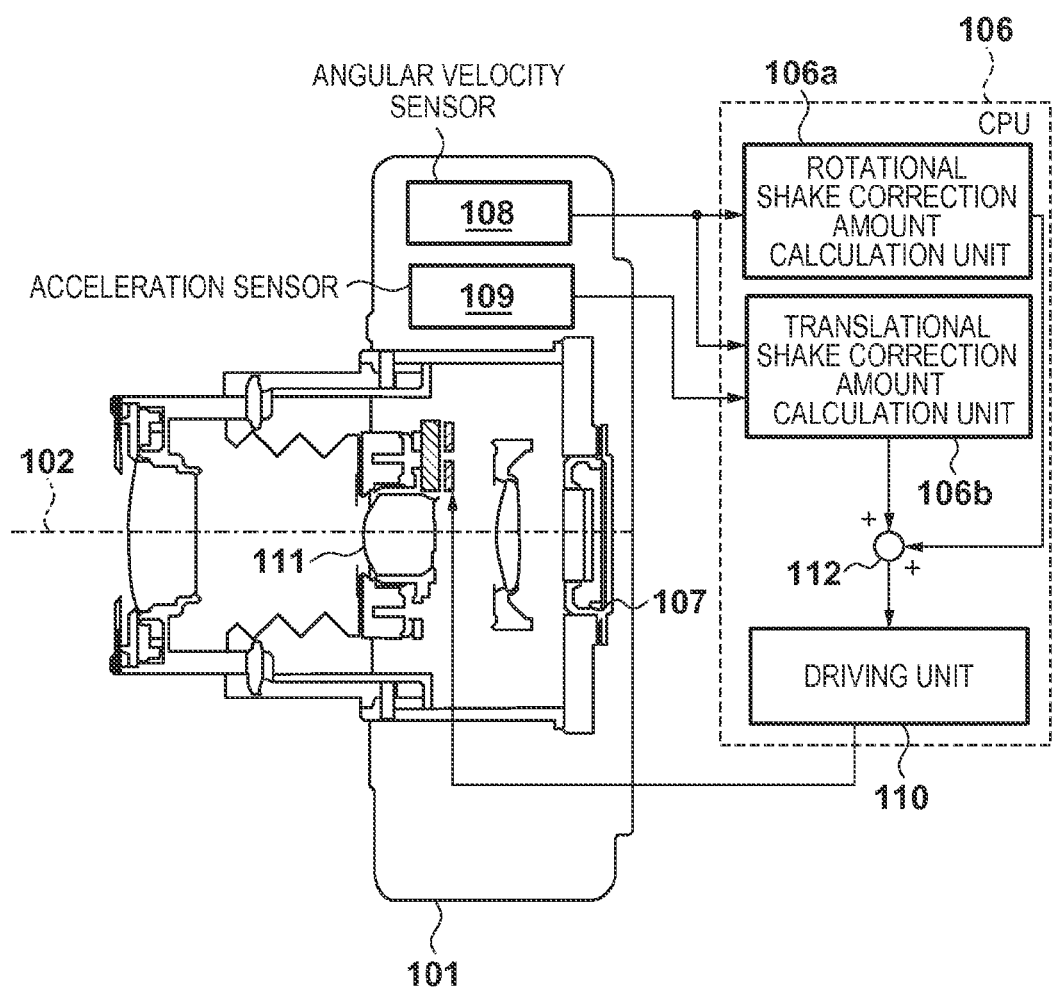
FIG. 2 is a diagram showing the top view of the camera and an image stabilization processing unit.
Figure 3:
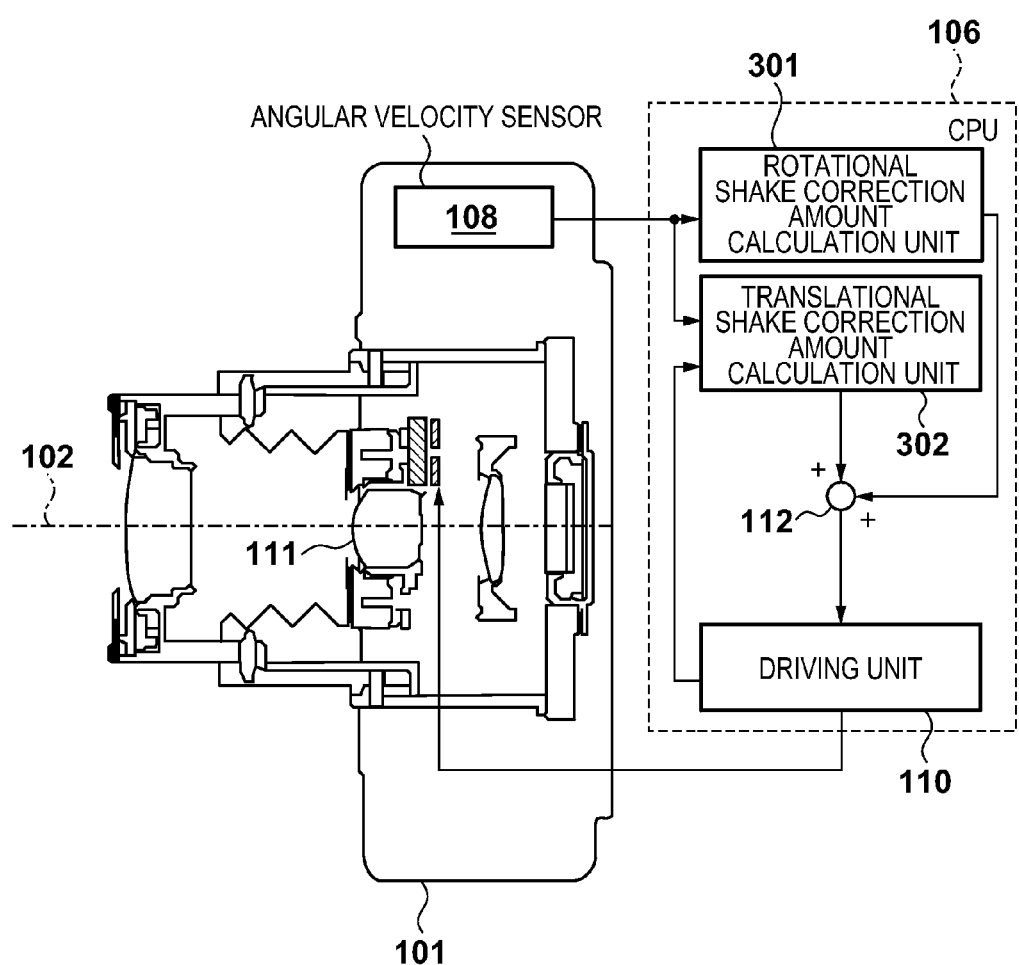
FIG. 3 is a diagram showing the top view of a camera incorporating an image stabilization system and an image stabilization processing unit according to a first embodiment.

FIG. 3 is a cross-sectional plan view of a camera including an image stabilization apparatus according to a first embodiment of the present invention. The constituent elements that are the same as those of FIG. 2 are given the same reference numerals. The image stabilization apparatus of the present invention can be incorporated in not only digital single-lens reflex cameras and digital compact cameras, but also digital video cameras, surveillance cameras, web cameras, mobile phones, and various other image capturing devices.

The difference from the conventional camera shown in FIG. 2 is that the acceleration sensor for performing translational shake detection is not provided and translational shakes are detected based on an angular velocity signal from the angular velocity sensor 108. Accordingly, in the camera 101 according to the first embodiment, a rotational shake correction amount is calculated by a rotational shake correction amount calculation unit 301 based on the angular velocity signal of the angular velocity sensor 108. Then, a translational shake correction amount calculation unit 302 calculates a translational shake correction amount.

Figure 4:
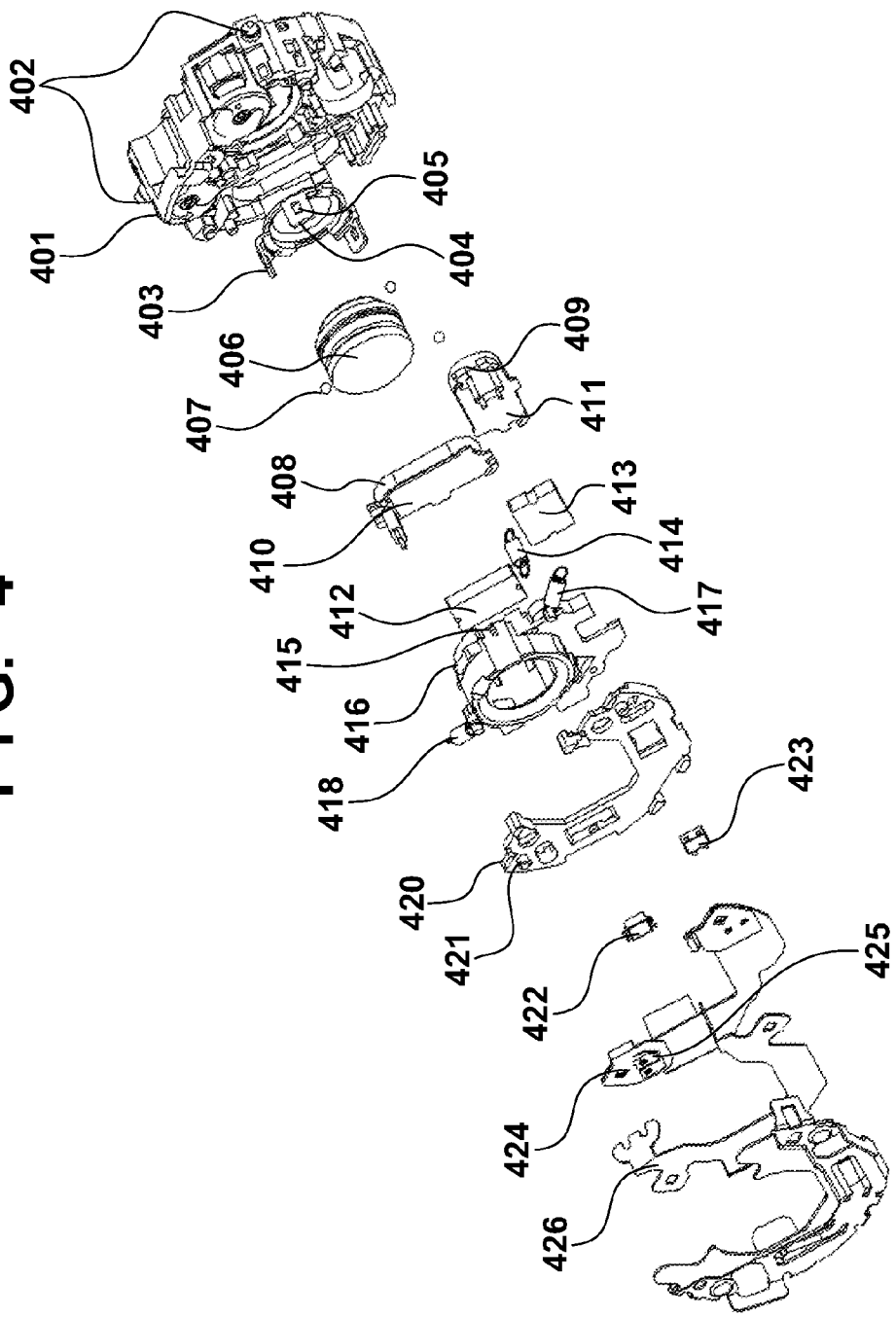
FIG. 4 is an exploded perspective view of an image stabilization mechanism according to the first embodiment.

FIG. 4 is an exploded perspective view of an image stabilization mechanism 111. Hereinafter, the image stabilization mechanism 111 will be described with reference to FIG. 4. A base 401 serving as the base of the image stabilization mechanism 111 fixedly holds both a shutter mechanism and an ND filter mechanism. The base 401 includes two follower pins 402 that are provided integrally as shown in the diagram and also a movable follower pin, which is not shown in the diagram. The three followers are configured such that as a result of the followers engaging with three cam grooves of a cam cylinder (not shown) provided radially outside of the base 401, the followers move back and forth in the optical axis direction along the cam grooves.

A correction lens group 406 is integrally held by a shift lens holder 416 with the use of a clamping pawl. A lens cover 403 has an opening that limits light beams passing through the correction lens group (hereinafter referred to as the "shift lens") 406, and three arms 404 extending along the side surface, each having an opening 405. By the arms 404 engaging with three protrusions 415 formed on the side surface of the shift lens holder 416, the shift lens is held integrally by the shift lens holder 416. Magnets 412 and 413 are held integrally by the shift lens holder 416.

The shift lens holder 416 is in press contact with the base via three ball bearings 407. The shift lens holder 416 is configured so as to be capable of free movement within a plane vertical to the optical axis as a result of the ball bearings 407 rolling. This method produces the effect of achieving vibrations of higher frequency with smaller amplitudes as compared with a method in which the shift lens holder is guided by a guide bar, and thus good correction can be performed even in high-resolution digital cameras.

A thrust spring 414 urges the shift lens holder 416 toward the base 401. Radial springs 417 and 418 are for preventing the shift lens holder 416 from rotating. The thrust spring 414 is a tensile spring whose one end engages with the protrusion 415 (hooking pawl) of the shift lens holder 416 while the other end engages with a hooking pawl (not shown) of the base 401, and thereby providing an urging force.

Bobbins 410 and 411 made of resin are for holding coils 408 and 409 and have a metal pin that is integrally provided at the tip and to which end portions of the coils 408 and 409 are connected. A flexible printed circuit (FPC) 424, which will be described later, is connected to the metal pin, whereby power is supplied from a control circuit (not shown). The FPC 424 supplies power to the coils 408 and 409, and in a land 425, the coils 408 and 409 are electrically connected via the metal pin.

Hall effect sensors 422 and 423 are for detection of changes in the magnetic field, and are disposed near the magnets 412 and 413, and detect changes in the magnetic field due to the movement of the magnets 412 and 413 and calculate the amount of movement. The hall effect sensors 422 and 423 are also mounted on the FPC 424 and thus receive supply of power from the FPC 424. An FPC 426 supplies power to a shutter and an ND filter driving unit.

An FPC holder 420 is for fixing the FPCs 424 and 426. The FPCs 424 and 426 are positioned and fixed by a cylindrical protrusion 421 being press-fitted into holes of the FPCs 424 and 426.

Figure 5:
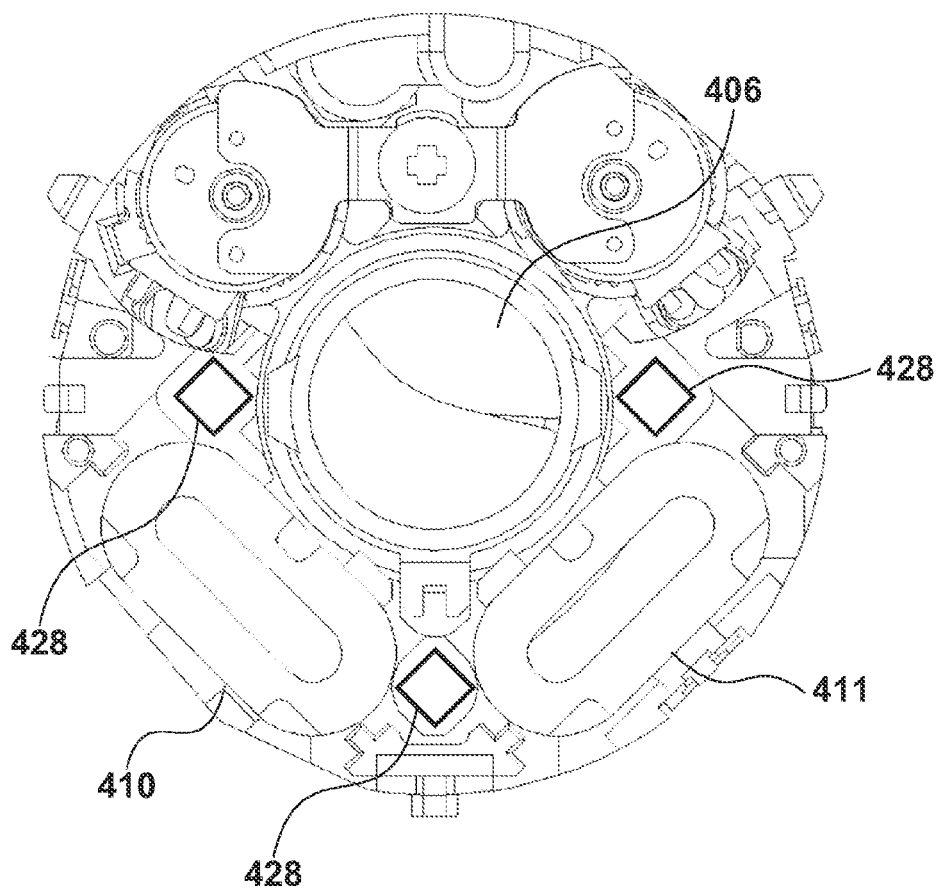
FIG. 5 is a front view of the image stabilization mechanism shown in FIG. 4.

FIG. 5 is a front view of the image stabilization mechanism 111 as viewed from the object side. In FIG. 5, recessed portions 428 (hereinafter referred to as a "reception portion") are provided at corners of the triangular shape formed by the ball bearings 407 near the shift lens. The ball bearings 407 are placed into the corresponding reception portions 428, and the reception portions 428 are in press contact with the shift lens holder 416 via the ball bearings 407. This configuration reduces friction and enables control such that the shift lens follows the target position with high accuracy, as well as enabling highly accurate calculation in translational shake estimation, which will be described later.

Figure 1:
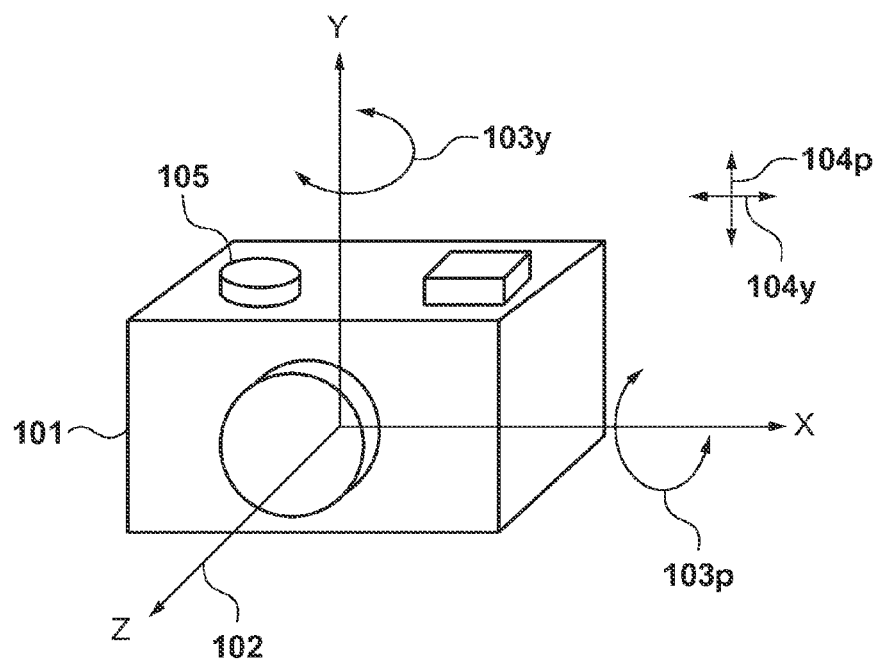
FIG. 1 is a diagram illustrating shake directions of a camera including an image stabilization apparatus.
Figure 6:
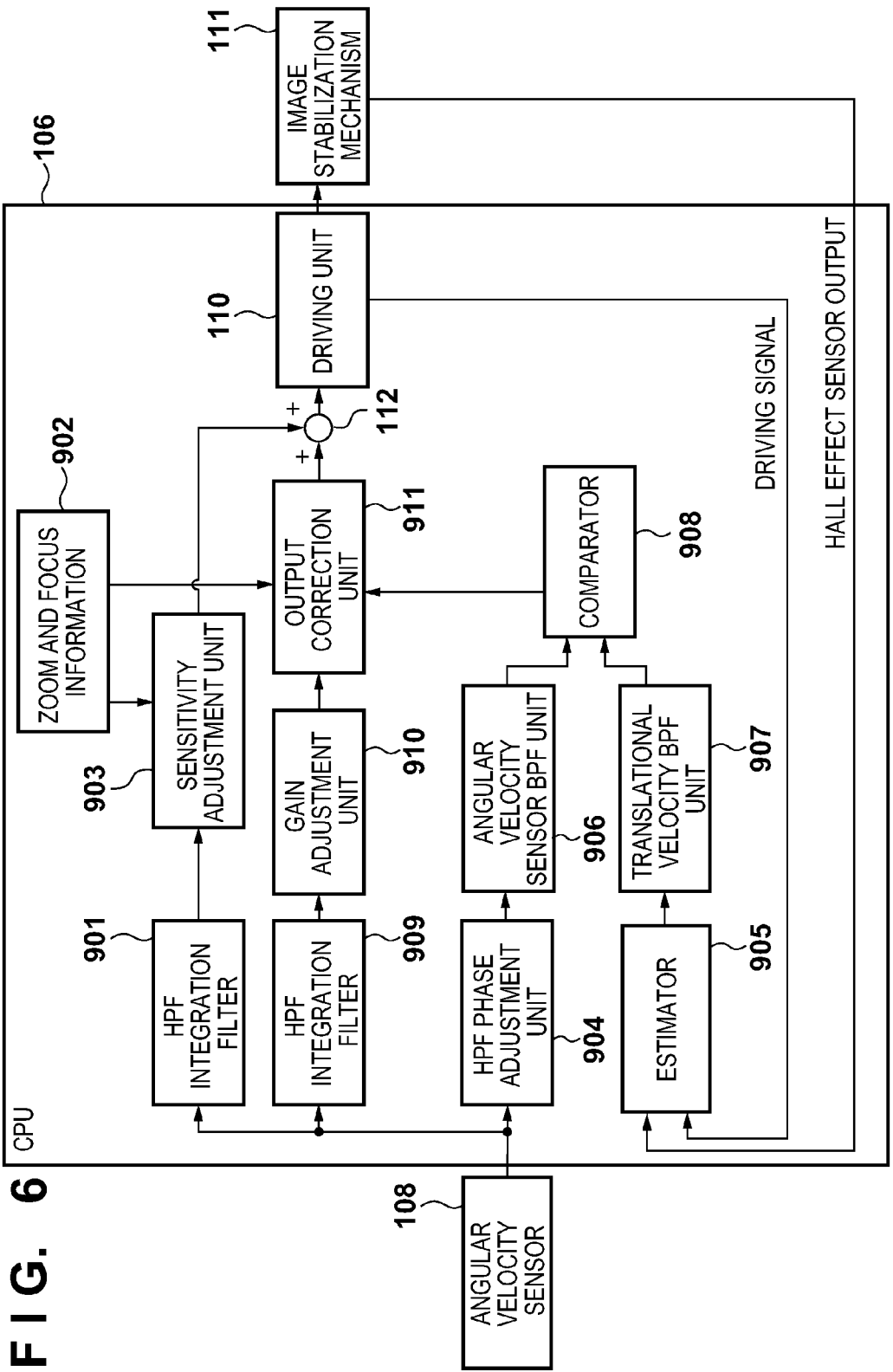
FIG. 6 is a block diagram showing a configuration of an image stabilization apparatus according to the first embodiment.

FIG. 6 is a block diagram illustrating the image stabilization apparatus according to the first embodiment. FIG. 6 only illustrates a configuration for shakes that occur in the vertical direction of the camera (that is, the pitch direction, or the directions indicated by the arrows 103*p* and 104*p* in FIG. 1). However, a similar configuration is also provided for shakes that occur in the horizontal direction of the camera (that is, the yaw direction, or the directions indicated by the arrows 103*y* and 104*y* in FIG. 1). Because these configurations are basically the same, only the configuration for the pitch direction is illustrated in the drawings, and the following descriptions will be given based thereon.

First, a procedure for finding a rotational shake amount will be described using FIG. 6. An angular velocity signal is input into the CPU 106 from the angular velocity sensor 108. The angular velocity signal has been input into an HPF integration filter 901, and after the DC component has been cut by the high pass filter (HPF), the resultant is integrated and converted into an angular signal. Here, because the frequency band of handshakes is generally between 1 Hz to 10 Hz, the HPF has first order HPF characteristics that cut only the frequency components not more than, for example, 0.1 Hz, which is well below the frequency band of handshakes.

The output of the HPF integration filter 901 is input into a sensitivity adjustment unit 903. The sensitivity adjustment unit 903 amplifies the output of the HPF integration filter 901 based on zoom and focus information 902, and a magnification ratio found based on the zoom and focus information 902, resulting in a rotational shake compensation target value (rotational shake correction amount). The sensitivity adjustment unit 903 is provided because the shake compensation sensitivity, which corresponds to the ratio of the shake amount of the camera image surface to the amount of movement of the compensation lens 111, changes due to changes in optical information such as the focus and zoom of the lens. The HPF integration filter 901 and the sensitivity adjustment unit comprises the rotational shake correction amount calculation unit 301. The rotational shake compensation target value obtained as above is output to the addition unit 112.

A procedure for determining a translational shake amount will be described next. In the translational shake detection according to the first embodiment, a translational velocity is detected using an observer (Kalman filter). As translational shakes, force disturbance due to the influence of gravity acceleration by posture changes, the influence of vibration acceleration by camera shake, and the like is applied to the camera 101. First, a concept of translational velocity estimation in the camera 101 by using the force disturbance applied to the image stabilization mechanism 111 will be described.

Figure 7:
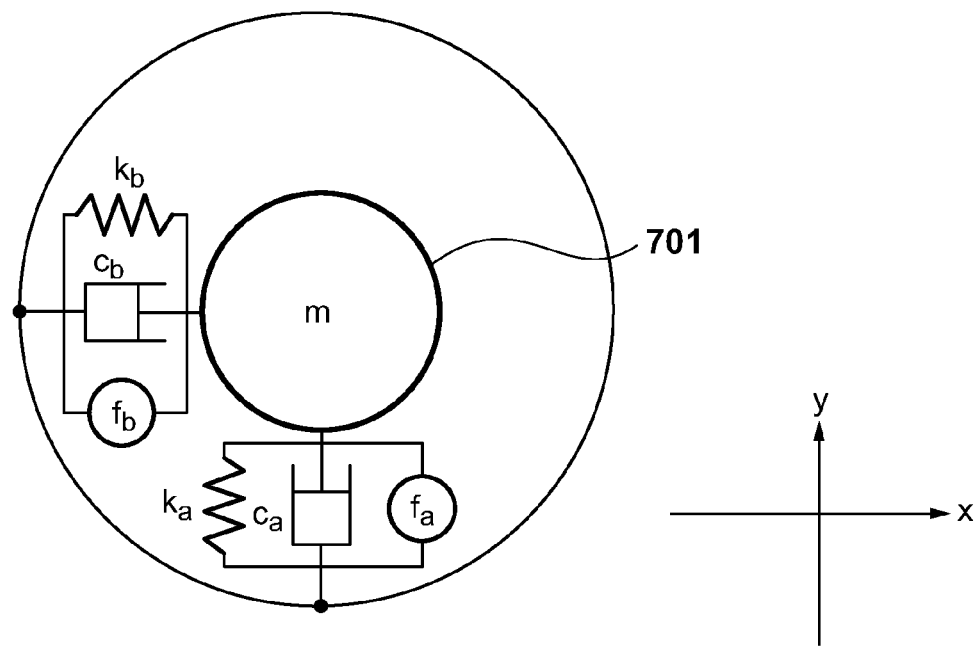
FIG. 7 is a diagram in which vibrations of a driven unit of the image stabilization mechanism according to the first embodiment have been modeled with two orthogonal axes.
Figure 8:
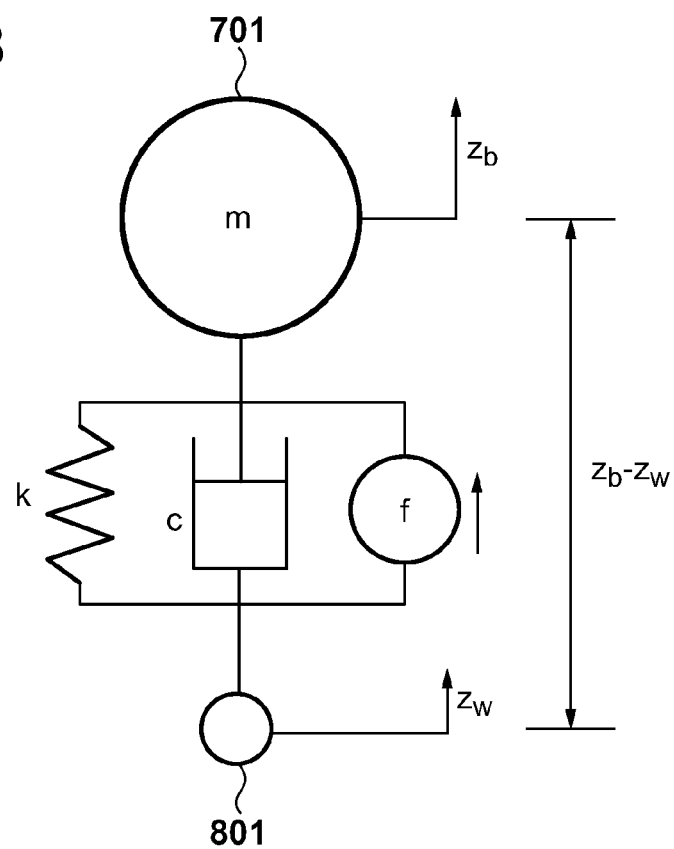
FIG. 8 is a diagram in which a single axis worth of vibrations of the driven unit of the image stabilization mechanism shown in FIG. 7 have been modeled with one degree of freedom.

FIG. 7 shows a plant in which the image stabilization mechanism 111 described above has been modeled with two orthogonal axes. FIG. 8 shows a diagram in which, as a model example of a single axis worth of vibrations, vibrations of a driven unit 701 of the image stabilization mechanism 111 including the shift lens 406 have been modeled with one degree of freedom. The driven unit 701 includes the shift lens 406 in the image stabilization mechanism 111, and is supported together with the main body of the camera 101 by a fixing unit 801 of the image stabilization mechanism 111.

In FIG. 8, the absolute moving amount (absolute shift amount) of the driven unit 701 in the image stabilization mechanism 111 is represented by zb, the absolute moving amount of the camera main body is represented by $z_w$, the spring constant is represented by k, the damping coefficient is represented by c, the thrust force generated by supply of power to the coils in the image stabilization mechanism 111 is represented by f, and the mass of the driven unit 701 is represented by m. In this case, the equation of motion of this system is expressed as shown by Formula (1):

$$m z \ddot{Y}_b = -k(z_b - z_w) - c(z\dot{Y}_b - z\dot{Y}_w) + f \quad (1)$$

The relative moving amount (relative shift amount) between the driven unit 701 and the fixing unit 801 can be detected by the hall effect sensors 422 and 423.

Accordingly, in order to make the relative moving amount between the driven unit 701 and the fixing unit 801 an observable output, as state variables, the relative moving amount $z_0$ between the driven unit 701 and the fixing unit 801, the absolute moving amount $z_b$ of the driven unit 701, and the absolute moving amount $z_w$ of the fixing unit 801 (camera main body) are expressed by Formula (2).

$$z_0 = z_b - z_w \quad (2)$$

Here, the state variables are combined into $x = [\dot{z}_b \; z_0]^T$. The relative moving amount $y = z_0$ as the output, the thrust force applied to the driven unit 701 $u = f$ as the input, and the camera main body absolute velocity $w = \dot{z}_w$ as the disturbance are substituted into the equation of state expressed by Formula (3):

$$x\dot{Y}(t) = Ax(t) + Bu(t) + Gw(t)$$

$$y(t) = Cx(t) + Du(t) + v(t) \quad (3)$$

It is assumed that v(t) is observed noise, which is Gaussian white noise whose average value and covariance are known and can be expressed by Formula (4):

$$E[w(t)] = 0, E[w(t)w^T(\tau)] = Q\delta(t-\tau)$$

$$E[v(t)] = 0, E[v(t)w^T(\tau)] = R\delta(t-\tau) \quad (4)$$

From Formulas (1) to (4) given above, the coefficients A, B, G, C and D of Formula (3) can be expressed as shown in Formula (5):

$$A = \begin{bmatrix} -\dfrac{c}{m} & -\dfrac{k}{m} \\ 1 & 0 \end{bmatrix}, \quad (5)$$

$$B = \begin{bmatrix} \dfrac{1}{m} \\ 0 \end{bmatrix},$$

$$G = \begin{bmatrix} \dfrac{c}{m} \\ -1 \end{bmatrix}$$

$$C = [0 \; 1],$$

$$D = [0].$$

Accordingly, if it is assumed that the relative moving amount between the driven unit 701 and the fixing unit 801 in the image stabilization mechanism 111 can be measured, from Formula (3), the observer is configured as shown in Formula (6):

$$\dot{\hat{x}} = A\hat{x} + Bu + L(y - C\hat{x}) \quad (6)$$

In the above formula, L is an observer gain. This observer gain L is a Kalman filter gain obtained in advance by solving the Riccati equation expressed by Formula (7):

$$AP + PA^T - PC^T R^{-1} CP + Q = 0 \quad (7)$$

From the positive definite symmetric solution P, the observer is determined as shown in Formula (8):

$$L = PC^T R^{-1} \quad (8)$$

By using this observer, it is possible to estimate the absolute velocity of the driven unit 701 and the relative moving amount between the driven unit 701 and the fixing unit 801, which are state variables. Then, the estimated relative moving amount $z_0$ is subjected to first-order differentiation, and the result is summed with the absolute velocity of the driven unit 701. In this manner, the absolute velocity of the main body of the camera 101 can be detected.

In the case where the value obtained as a result of first-order differentiation of the estimated relative moving amount $z_0$ is much smaller than the absolute velocity of the driven unit 701, the following may be performed. Specifically, the estimated absolute velocity of the driven unit 701 may be used in translational shake correction as the absolute velocity of the main body of the camera 101 without being combined with the result of the first-order differentiation of the relative moving amount $z_0$.

Figure 9:
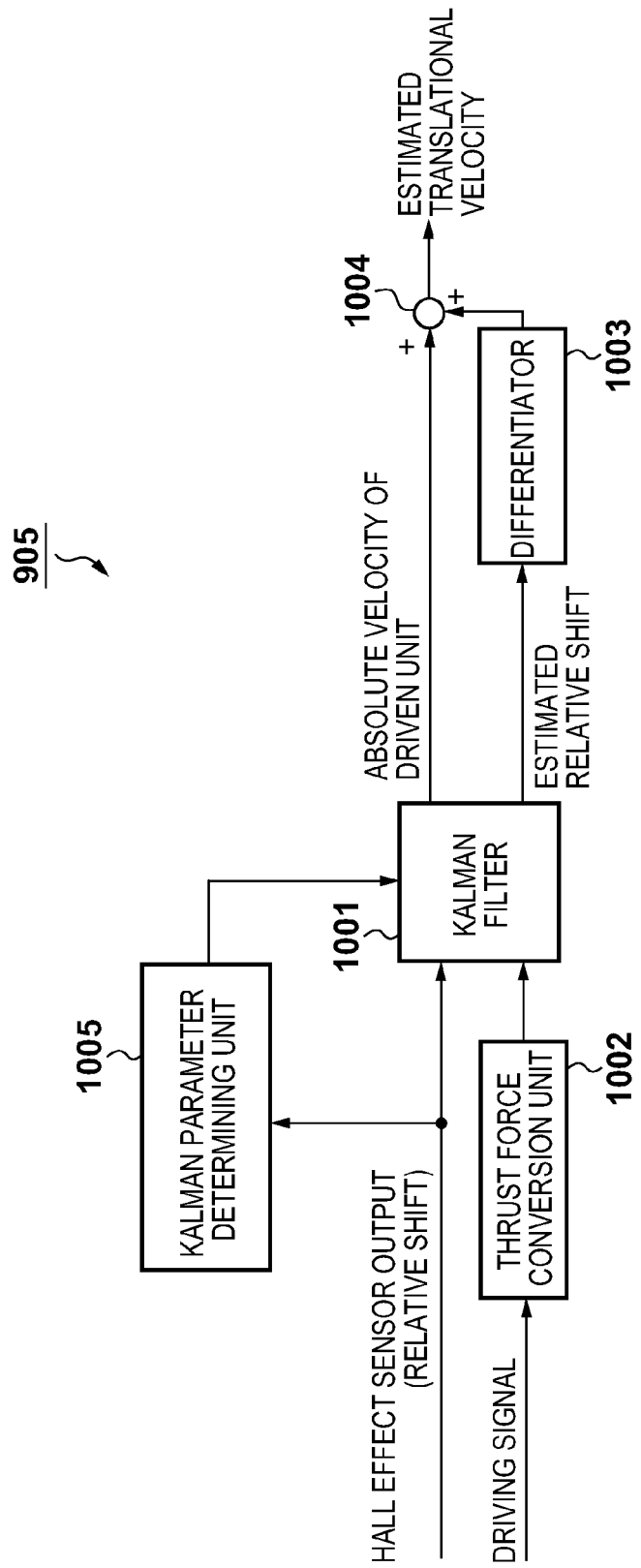
FIG. 9 is a block diagram showing a configuration of an estimator according to the first embodiment.

FIG. 9 is a block diagram showing a configuration of an estimator 905 that estimates a translational velocity by using the concept shown in FIGS. 7 and 8. First, a thrust force conversion unit 1002 performs multiplication of a thrust force conversion coefficient for converting the driving signal from the driving unit 110 to a thrust force, so as to calculate a driving thrust to the image stabilization mechanism 111. Then, the output of the thrust force conversion unit 1002 and the outputs (relative moving amount/relative shift amount) from the hall effect sensors 422 and 423 are input into a Kalman filter 1001. Then, the Kalman filter 1001 estimates, by using the method described above with reference to Formulas (1) to (8), the absolute velocity of the driven unit 701 of the image stabilization mechanism 111 and the relative moving amount between the driven unit 701 and the fixing unit 801. The estimated relative moving amount is subjected to first-order differentiation in a differentiator 1003, which is then combined with the estimated absolute velocity of the driven unit 701 of the image stabilization mechanism 111 in an addition unit 1004, whereby an estimated translational velocity is calculated. The Kalman filter 1001 also receives an input of a Kalman parameter, which is an estimated parameter that has been calculated by a Kalman parameter determining unit 1005.

Figure 10:
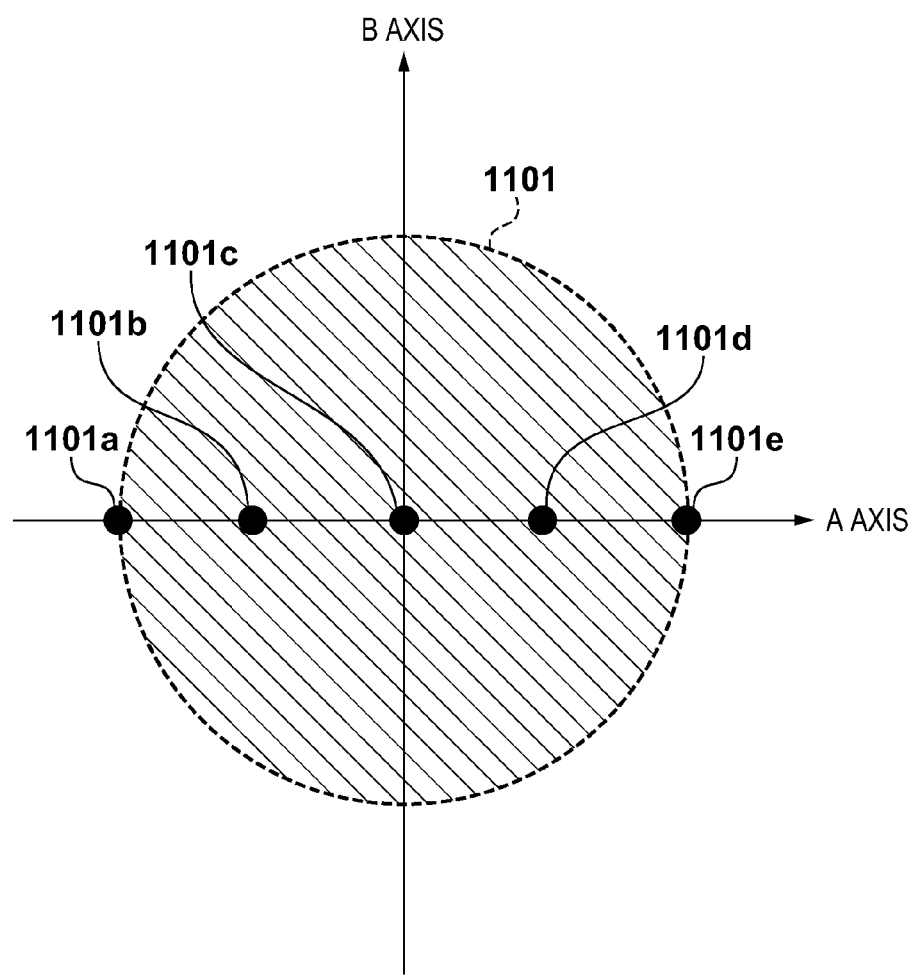
FIG. 10 is a diagram showing an available range of movement of the driven unit of the image stabilization mechanism according to the first embodiment.

Next, the Kalman parameter calculated by the Kalman parameter determining unit 1005 will be described. FIG. 10 is a diagram showing an available range of movement of the driven unit 701 of the image stabilization mechanism 111, and FIG. 11 shows mechanical characteristics of spring constant k according to the position of the driven unit 701. As shown in FIG. 11, in the case where the Kalman filter 1001 has been designed based on ideal linear characteristics 1201 and characteristics 1202 are the actual mechanical characteristics, if the driven unit 701 moves to a position near the ends of the available range of movement as indicated by positions 1101a and 1101e in FIG. 10, the following problem arises.

Specifically, because the parameter of the Kalman filter 1001 is determined by the driven unit 701, taking the characteristics near the driving center position into consideration, it is not possible to cope with changes in the characteristics occurring at a position shifted from the driving center position.

Accordingly, as shown in FIG. 11, characteristics at respective positions are subjected to linear approximation, and the spring constant set in the Kalman filter 1001 is switched to $k_a$, $k_b$, $k_c$, $k_d$ or $k_e$ according to the position of the driven unit 701. Switching in this manner makes it possible to cope with the changes in the mechanical characteristics due to changes in the position of the driven unit 701, whereby the accuracy of estimation can be improved.

FIG. 12 shows mechanical characteristics of damping coefficient c according to the position of the driven unit 701. In FIG. 11, the method for changing the spring constant k according to changes in the position of the driven unit 701 was described, but when damping characteristics change according to the position of the driven unit 701, the damping coefficient c can be changed to cope with the situation. In FIG. 12, graphs 1301 to 1303 change according to the distance (moving amount) from the driving center position 1101c shown in FIG. 10 to the driven unit 701 and velocity V. The graph 1301 shows the damping coefficient in the case where the driven unit 701 is in a range corresponding to spring constant $k_c$ and having a position 1101c as the center thereof in FIG. 11. The graph 1302 shows the damping coefficient in the case where the driven unit 701 is in a range corresponding to spring constant $k_b$ or $k_d$ and having a position 1101b or 1101d as the center thereof in FIG. 11. The graph 1303 shows the damping coefficient in the case where the driven unit 701 is in a range corresponding to spring constant $k_a$ or $k_e$ and having a position 1101a or 1101e as the center thereof in FIG. 11.

In the manner described above, the translational velocity is estimated by the estimator 905. Then, in a translational velocity BPF unit 907, from the output of the estimator 905, only frequency components of a predetermined band are extracted, and the resultant is output to a comparator 908.

On the other hand, the angular velocity signal from the angular velocity sensor 108 is also input into an HPF integration filter 909, DC components are cut by the HPF, and thereafter integration is performed, whereby the signal is converted to an angular signal. The output of the HPF integration filter 909 is input into a gain adjustment filter (hereinafter referred to as a "gain adjustment unit") 910. The gain adjustment unit 910 and the HPF integration filter 909 together adjust the gain and phase characteristics in the frequency band where translational shake correction should be performed. The output of the gain adjustment unit 910 is output to an output correction unit 911.

In parallel to the above processing, the angular velocity signal from the angular velocity sensor 108 is also input into an HPF phase adjustment unit (HPF phase adjustment filter) 904, where DC components overlapping the output of the angular velocity sensor 108 are cut, and phase adjustment is performed on the signal. From the output of the HPF phase adjustment unit 904, only frequency components of a predetermined band are extracted by an angular velocity sensor band pass filter (BPF) unit 906.

The outputs of the angular velocity sensor band pass filter (BPF) unit 906 and the translational velocity BPF unit 907 are input into the comparator 908, where a correction amount (correction coefficient) for correcting the output of the gain adjustment unit 910 is calculated and then output to the output correction unit 911. The method for calculating the correction amount by the comparator 908 will be described later.

In addition to the correction amount (correction coefficient) from the comparator 908, the zoom and focus information 902 is also input into the output correction unit 911. The magnification ratio is calculated based on the zoom and focus information 902, and the output of the gain adjustment unit 910 is corrected based on the obtained magnification ratio and the correction amount from the comparator 908, whereby a target translational shake correction value is obtained. Accordingly, the configuration spanning from the HPF phase adjustment unit 904 to the output correction unit 911 constitutes the translational shake correction amount calculation unit 302 shown in FIG. 3.

The determined target translational shake correction value is added to (combined with) the angular image stabilization target value in the addition unit 112, and then output to the driving unit 110. In response thereto, the image stabilization mechanism 111 is driven by the driving unit 110 and both rotational shakes and translational shakes are corrected.

Figure 13:
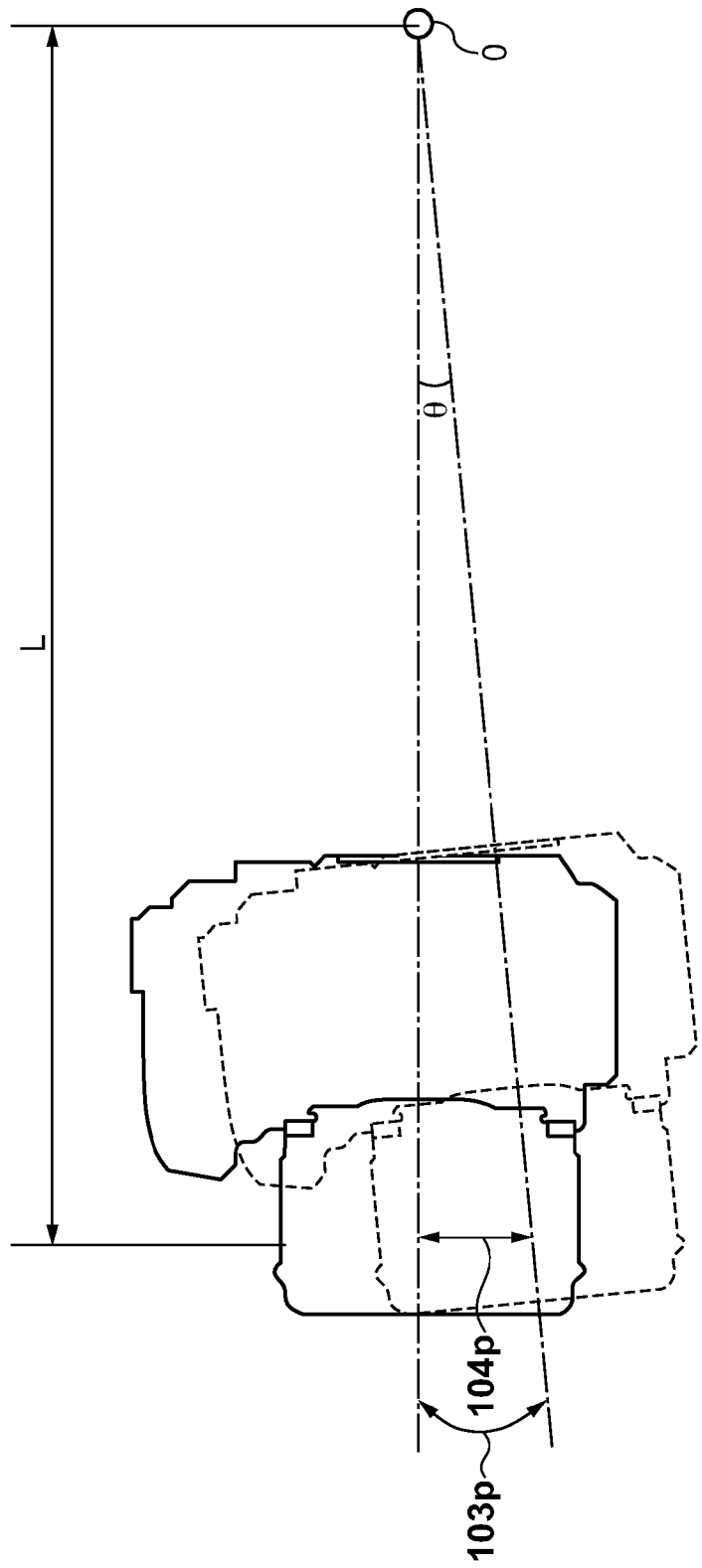
FIG. 13 is a diagram illustrating a rotational shake and a translational shake applied to the camera according to the first embodiment.

Next, the correction value output from the comparator 908 will be described. FIG. 13 is a diagram showing a rotational shake 103p and a translational shake 104p applied to the camera. Here, it is assumed that the amount of the translational shake 104p at the principal point of the optical imaging system in the camera lens of the camera 101 is defined as Y, and the shake angle of the rotational shake 103p is defined as θ (rad), and that the center of rotation is defined as O, and the radius of rotation, which is the distance from the center O of rotation to the image stabilizer that detects translational shakes, is defined as L, the relationship between the shake amount Y, the shake angle θ and the radius of rotation L can be expressed by the following Formula (9):

$$Y = L\theta \tag{9}$$

In Formula (9), the moving amount Y can be obtained by subjecting the estimated translational velocity output by the estimator 905 to first-order integral, and the shake angle θ can be obtained by subjecting the output of the angular velocity sensor 108 to first-order integral. Also, by using angular velocity ω obtained from the output of the angular velocity sensor 108 by the angular velocity sensor band pass filter (BPF) unit 906, the relationship between the radius of rotation L and the estimated translational velocity V that was obtained from the estimator 905 and from which only frequency components of a predetermined band have been extracted by the translational velocity BPF unit 907 can be expressed by the following Formula (10):

$$V = L\omega \tag{10}$$

The radius of rotation L can be obtained from either of the above Formulas (9) and (10). The radius of rotation L may be calculated from the ratio between the maximum amplitude peak values of the velocity V and the angular velocity ω within a predetermined amount of time that is set to, for example, approximately 200 ms in the case where the cutoff frequency of the angular velocity sensor BPF unit 906 and the translational velocity BPF unit 907 is 5 Hz. Furthermore, the radius of rotation L may be updated each time the velocity V and the angular velocity ω are calculated. At this time, high-frequency noise components generated when the radius of rotation L is calculated can be removed by averaging the velocity V and the angular velocity ω in time series, cutting the high-frequency components using a low-pass filter (LPF), or the like. The comparator 908 outputs the radius of rotation L determined in the manner described above to the output correction unit 911 as the correction amount.

Meanwhile, a shake δ generated in the imaging surface can be expressed by the following Formula (11) by using the shake amount Y of the translational shake at the principal point of the optical imaging system, the shake angle θ of the optical imaging system, and a focal length f and magnification ratio β of the optical imaging system.

$$\delta = (1+\beta)f\theta + \beta Y \quad (11)$$

Here, the focal length f, which is the first term on the right side of the Formula (11), can be obtained from the zoom and focus information 902 of the optical imaging system. In addition, the magnification ratio β expresses the ratio of the size of an image of an object formed on the image sensor 107 relative to the actual size of the object, and can also be obtained from the zoom and focus information of the optical imaging system. Furthermore, the shake angle θ can be obtained from the result of integration of the angular velocity sensor 108. Accordingly, from these pieces of information, the rotational shake correction amount can be obtained in the manner described with reference to FIG. 6.

Also, the second term on the right side is obtained from the estimated translational velocity output by the estimator 905, the zoom and focus information 902, and the magnification ratio β obtained based on the zoom and focus information 902, and thus the translational shake correction amount can be determined from these pieces of information in the manner described with reference to FIG. 6.

However, in the first embodiment, image stabilization is performed on shake δ expressed by the following Formula (12) obtained by rewriting Formula (11):

$$\delta = (1+\beta)f\theta + \beta L\theta \quad (12)$$

That is, for translational shakes, the translational shake moving amount Y obtained directly from the estimated translational velocity output by the estimator 905 is not used. The radius of rotation L obtained from Formula (9) or (10) is first determined, and in the output correction unit 911, correction is performed based on the obtained radius of rotation L, the result (θ) of integration of the output of the angular velocity sensor 108, the zoom and focus information 902 and the magnification ratio β obtained from the zoom and focus information 902.

As described above, translational shake correction can be performed by calculating the translational velocity by the observer (Kalman filter) using the relative moving amount between the driven unit 701 and the fixing unit 801 of the image stabilization mechanism 111 as a state variable and the driving thrust to the image stabilization mechanism 111 as an input variable. However, in the case of the Kalman filter 1001 that has been designed using only a model in which the mechanical characteristics of the image stabilization mechanism 111 are constant, when the driven unit moves to a position near the ends of the available range of movement, the mechanical characteristics of the image stabilization mechanism 111 change, causing an error in estimation of the translational velocity and negatively affecting the performance of the image stabilization effect.

To address this, as described in the first embodiment, mechanical characteristics according to the position of the image stabilization mechanism 111 are pre-set, by switching the parameter of the Kalman filter, errors in estimation of the translational velocity due to characteristics changes can be prevented while the simple observer configuration is used. It is thereby possible to improve the image stabilization performance in the translational shake correction.

In the first embodiment, as the image stabilization mechanism 111, a so-called optical image stabilization is used in which the image stabilization lens is moved within a plane vertical to the optical axis based on the calculated correction amount. However, the correction method based on the correction amount is not limited to the optical image stabilization, and the following methods can be used: a method in which the image sensor is moved within a plane vertical to the optical axis; and a method using electronic image stabilization in which the influence of shakes is reduced by changing the clipping position in each captured frame output from the image sensor. Furthermore, an object of the present invention can also be achieved by performing correction by combining the above methods.

Also, with respect to the translational shake estimation, the present invention can be implemented by a method other than the method using the relative moving amount of the image stabilization lens described in the first embodiment. For example, in the case where the image stabilization mechanism 111 is used that performs image stabilization by moving the image capturing apparatus within a plane vertical to the optical axis, any method can be used as long as the relative moving amount between the driven unit and the fixing unit of the image stabilization mechanism 111 can be observed. In this case as well, by configuring the observer by using the relative moving amount between the driven unit and the fixing unit of the image stabilization mechanism 111 as a state variable and the driving thrust to the image stabilization mechanism 111 as an input variable, the absolute velocity of the camera main body can be detected by using the same method as that described above.

Second Embodiment

Figure 14:
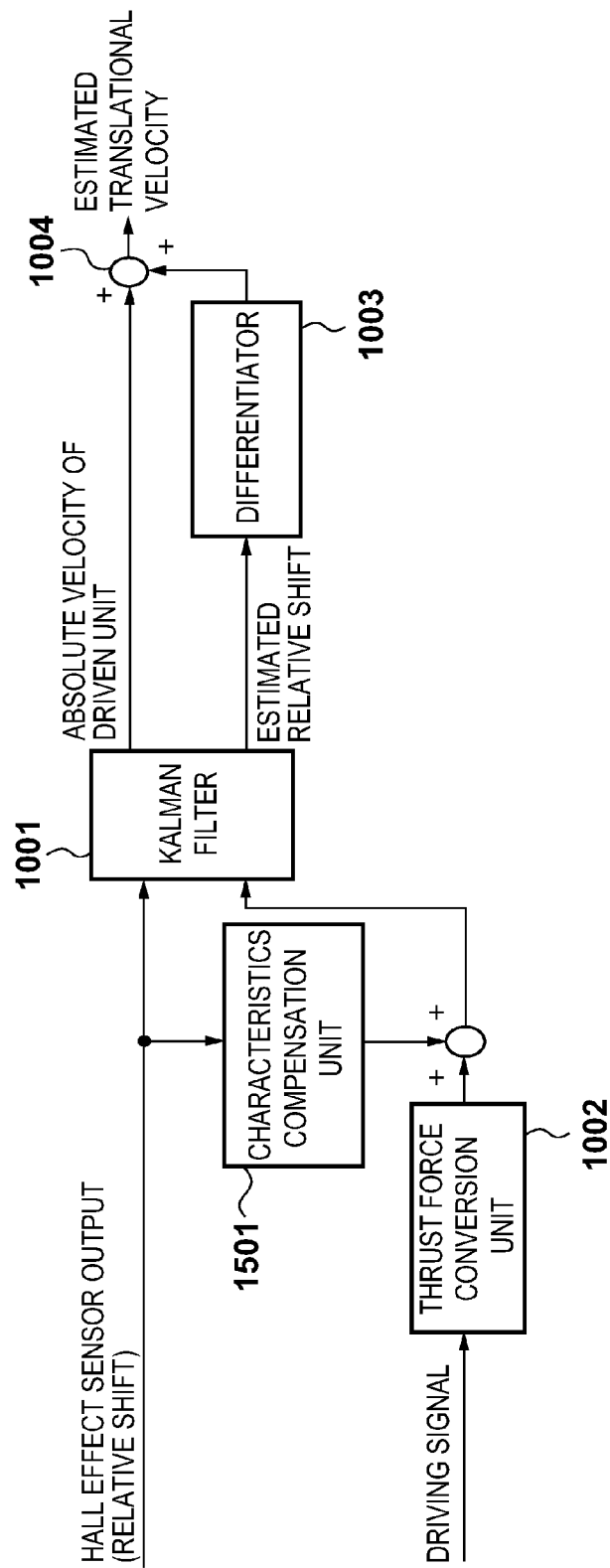
FIG. 14 is a block diagram of a translational velocity estimator of an image stabilization apparatus according to a second embodiment.

FIG. 14 is a block diagram showing a configuration of an estimator 905 of an image stabilization apparatus included in a camera 101 according to a second embodiment. Since processing other than that involving the estimator 905 is the same as that described in the first embodiment, a description thereof is not given here.

The difference between the configuration of the estimator 905 described in the first embodiment with reference to FIG. 9 and the configuration of the estimator 905 of the second embodiment shown in FIG. 14 is that a characteristics compensation unit 1501 of the image stabilization mechanism 111 is provided in place of the Kalman parameter determining unit 1005. The characteristics compensation unit 1501 compensates for a shift in the characteristics of the image stabilization mechanism 111 with respect to the driving thrust obtained by multiplying the drive instruction signal by the thrust force conversion coefficient, and inputs the result to the Kalman filter 1001.

Figure 15:
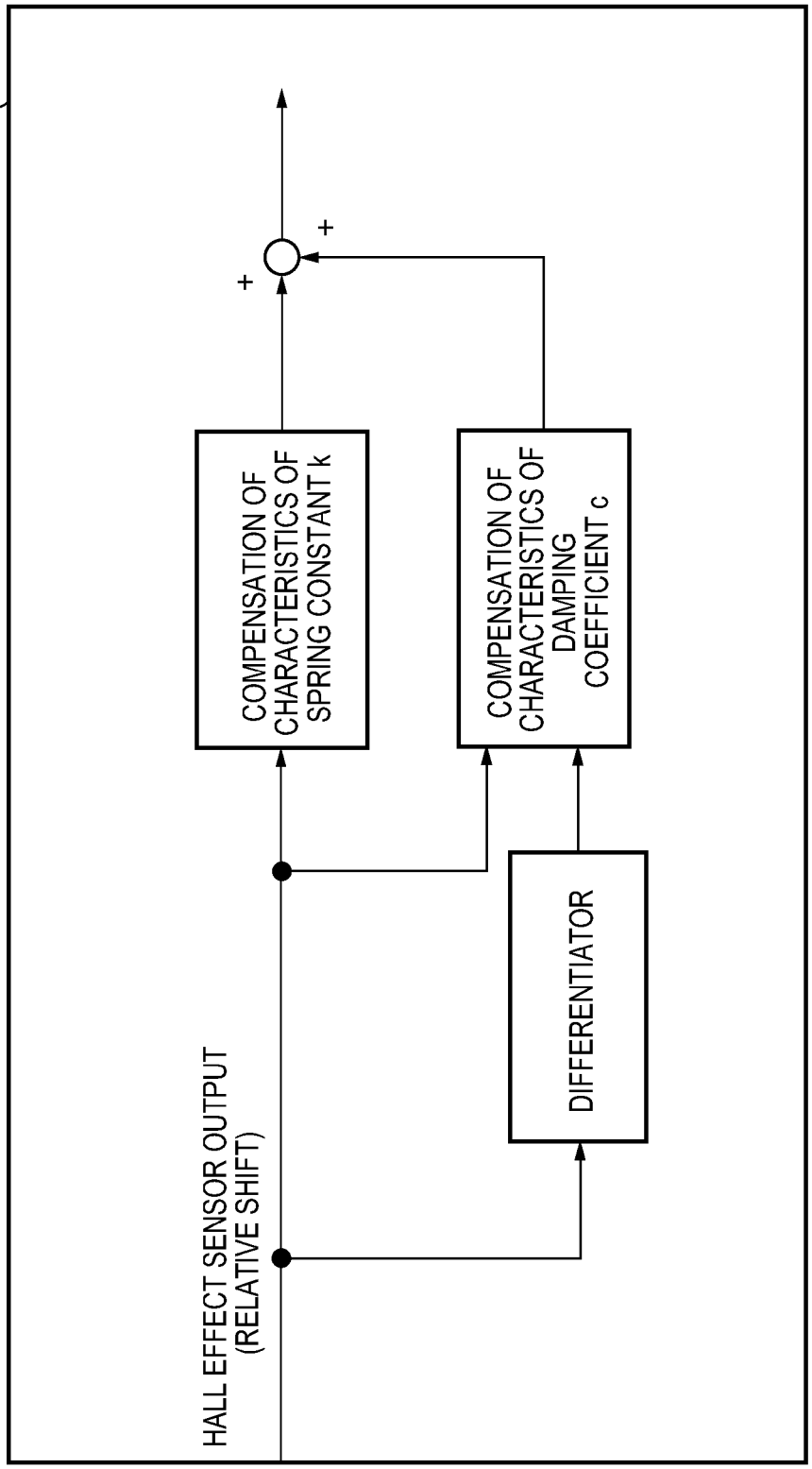
FIG. 15 is a block diagram showing the content of compensation processing of a characteristics compensator according to the second embodiment.
Figure 16:
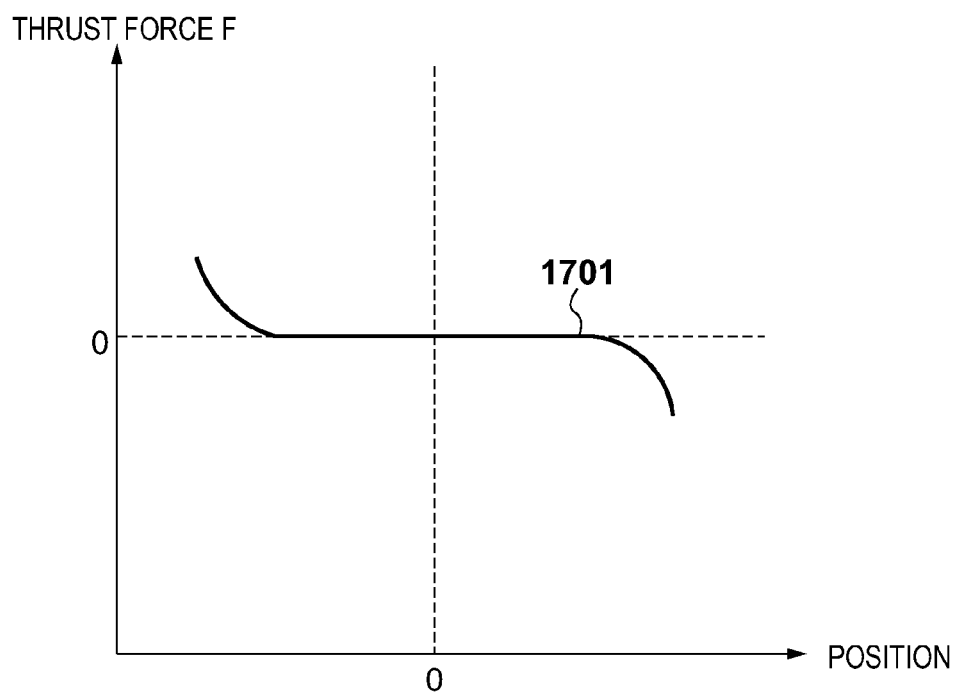
FIG. 16 is a diagram showing a value for compensating the characteristics of a spring constant according to the second embodiment.

FIG. 15 is a block diagram showing the content of compensation processing performed by the characteristics compensation unit 1501 shown in FIG. 14. In the second embodiment, the accuracy of estimation is improved in the manner described below, rather than improving the accuracy of estimation by changing the Kalman parameter taking into consideration the spring constant k and the damping coefficient c that change according to the position of the driven unit 701 of the image stabilization mechanism 111. Specifically, a table is configured that indicates the difference between the linear characteristics 1201 (reference value) of the spring constant k shown in FIG. 11 used to design the Kalman filter and the actual characteristics 1202. Then, when the driven unit 701 of the image stabilization mechanism 111 moves to the ends of the available range of movement, and changes occur in the characteristics, compensation is performed so as to improve the performance of estimation. In FIG. 16, 1701 represents characteristics when the difference between the linear characteristics 1201 of the spring constant k shown in FIG. 11 and the actual characteristics 1202 is indicated in a table.

Figure 17:
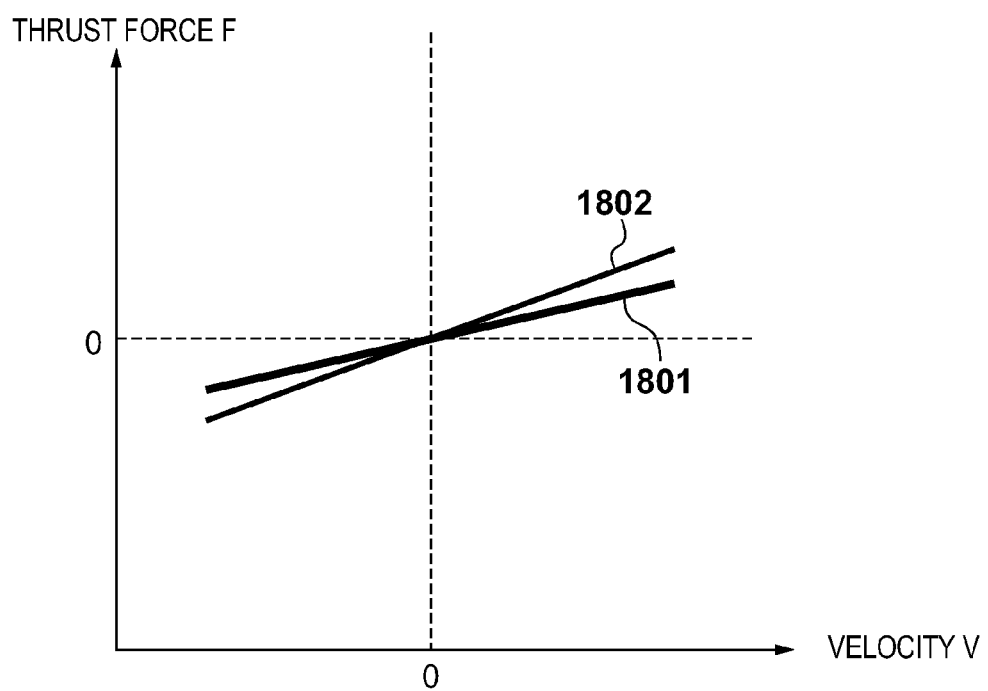
FIG. 17 is a diagram showing values for compensating the characteristics of a damping coefficient according to the second embodiment.

With respect to changes in the characteristics of the damping coefficient c as well, a table is configured in which the difference of the damping coefficient c used to design the Kalman filter is indicated by characteristics 1801 and 1802 in FIG. 17, and the difference of the driving thrust may be compensated. The characteristics 1801 are characteristics indicating the difference between damping coefficient $c_1$ and damping coefficient $c_2$ shown in FIG. 12, and the characteristics 1802 are characteristics indicating the difference between damping coefficient $c_1$ and damping coefficient $c_3$ shown in FIG. 12.

As described above, when the driven unit 701 of the image stabilization mechanism 111 is at a position near the ends of the available range of movement, a shift occurs in the driving thrust. The estimated translational velocity is calculated from an input of the driving thrust and the outputs (relative moving amount) of the hall effect sensors 422 and 423, and therefore the occurrence of an error in the driving thrust negatively affects the accuracy of estimation. However, according to the second embodiment described above, shifts in the driving thrust due to the position of the driven unit 701 are compensated with a preset driving thrust, the estimated translational velocity can be calculated with good accuracy and degradation of the performance of image stabilization can be prevented, and therefore the performance of correcting image blur caused by translational shakes is improved.

Third Embodiment

Figure 18:
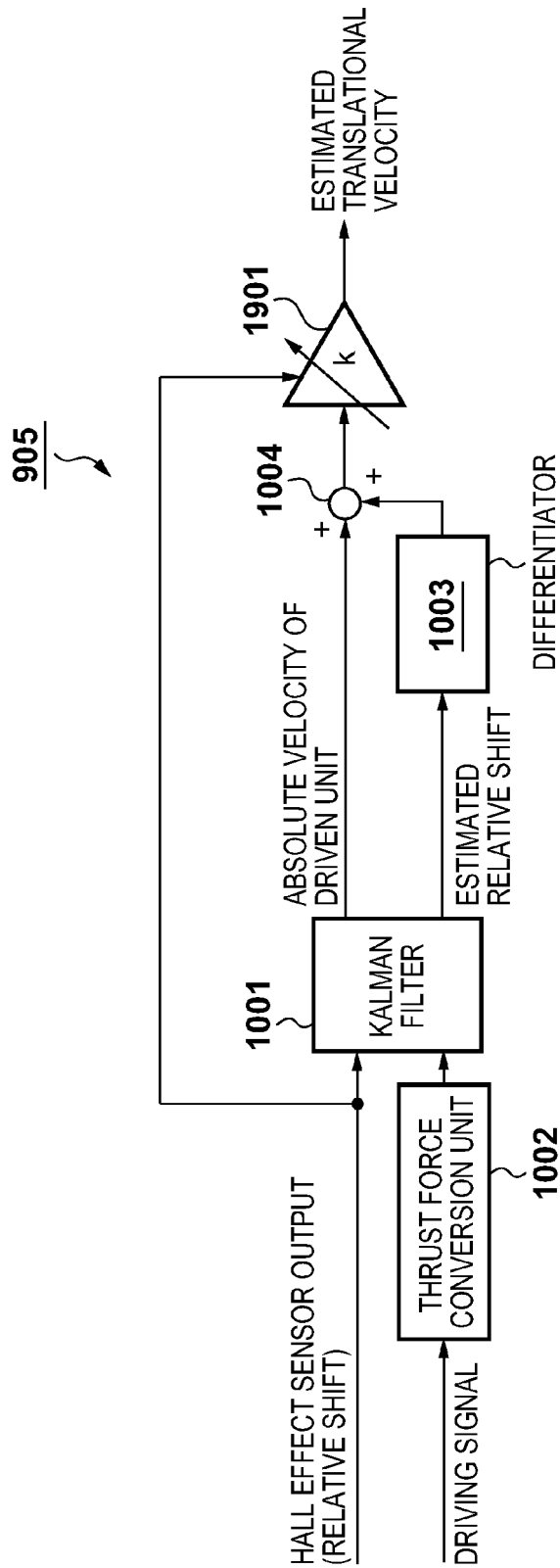
FIG. 18 is a block diagram of a translational velocity estimator of an image stabilization apparatus according to a third embodiment.

FIG. 18 is a block diagram showing a configuration of an estimator 905 of an image stabilization apparatus included in a camera 101 according to a third embodiment. Since processing other than that involving the estimator 905 is the same as that described in the first embodiment, a description thereof is not given here.

The difference between the configuration of the estimator 905 described in the first embodiment with reference to FIG. 9 and the configuration of the estimator 905 of the third embodiment shown in FIG. 18 is that the Kalman parameter determining unit 1005 is not provided, instead, a variable gain amplifier 1901 is provided. In other words, in the third embodiment, in the variable gain amplifier 1901, the estimated translational velocity is adjusted by multiplication of a variable gain according to the position of the image stabilization mechanism 111 determined from the hall effect output (relative moving amount).

Figure 19:
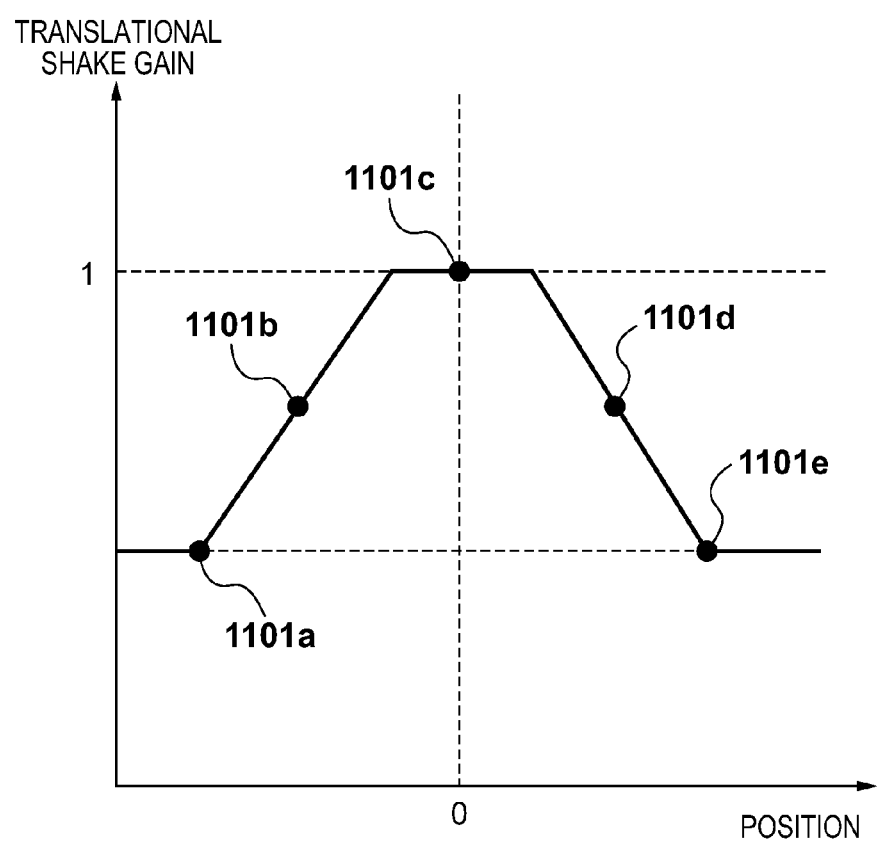
FIG. 19 is a diagram showing a gain for correcting translational velocity according to the third embodiment.

FIG. 19 shows a translational shake gain according to the position of the image stabilization mechanism 111. The translational shake gain is set to one fold when the driven unit 701 of the image stabilization mechanism 111 is at a position near the center position 1101c of the available range of movement. As the driven unit 701 moves toward an end of the available range of movement from the center position 1101c, the translational shake correction gain having a value smaller than 1 is multiplied.

By performing control as described above, under conditions in which the driven unit 701 of the image stabilization mechanism 111 moves toward an end of the available range of movement, the translational shake gain is set to a value smaller than that when the driven unit 701 is at a position near the center of the image stabilization range. By doing so, the estimated translational velocity is intentionally set to be smaller so as to reduce the influence of errors in translational shake estimation that occur as the driven unit 701 moves toward an end of the available range of movement thereof. As a result, overcorrection of image blur due to translational shakes can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-280243, filed on Dec. 21, 2011, which is hereby incorporated by reference herein in its entirety.

What is claimed is:

1. An image stabilization apparatus comprising:
   an image stabilization unit that reduces image blur due to a shake by moving a driven unit;
   a calculation unit that estimates the shake based on a position of the driven unit and a driving force applied to the driven unit and that calculates a translational shake correction amount based on the estimated shake; and
   a driving unit that drives the driven unit of the image stabilization unit based on the translational shake correction amount,
   wherein when the driven unit is at a position away from a center of a range of movement of the driven unit, the calculation unit sets the translational shake correction amount to be smaller than that when the driven unit is at the center of the range of movement.

2. The image stabilization apparatus according to claim 1, wherein the calculation unit includes an estimator using a Kalman filter, and when a moving amount of the driven unit is large, the calculation unit multiplies the estimated shake by a gain smaller than that when the moving amount of the driven unit is small.

3. The image stabilization apparatus according to claim 2, wherein when movement characteristics of the driven unit is represented by a driving thrust by the driving unit based on a mass and the moving amount of the driven unit, a spring constant, a damping coefficient and a driving signal, the Kalman filter estimates a velocity of the shake by using the moving amount of the driven unit obtained from the image stabilization unit as a state variable and the driving thrust as an input variable, and
   wherein a parameter that changes according to the moving amount of the driven unit is at least either one of the spring constant or the damping coefficient, and the calculation unit compensates for a change in at least either one of the spring constant or the damping coefficient when the velocity of the shake is estimated.

4. The image stabilization apparatus according to claim 3, wherein the spring constant changes according to the moving amount of the driven unit, and
   wherein the calculation unit estimates the velocity of the translational shake by using the spring constant corresponding to the moving amount.

5. The image stabilization apparatus according to claim 3, wherein the spring constant changes according to the moving amount of the driven unit, and
   wherein the calculation unit holds a difference between a reference value of the spring constant and the spring constant that changes according to the moving amount of the driven unit and estimates the velocity of the translational shake by using the driving thrust compensated with the difference.

6. The image stabilization apparatus according to claim 3, wherein the damping coefficient changes according to the moving amount of the driven unit,
   wherein the calculation unit estimates the velocity of the translational shake by using the damping coefficient corresponding to the moving amount.

7. The image stabilization apparatus according to claim 3,
wherein the damping coefficient changes according to the moving amount of the driven unit,
wherein the calculation unit holds a difference between a reference value of the damping coefficient and the damping coefficient that changes according to the moving amount of the driven unit and estimates the velocity of the translational shake by using the driving thrust compensated with the difference.

8. An optical apparatus comprising the image stabilization apparatus according to claim 1.

9. An image capturing apparatus comprising the image stabilization apparatus according to claim 1.

10. A method for controlling an image stabilization apparatus including an image stabilization unit that corrects image blur due to a shake by moving a driven unit, the method comprising:
estimating the shake based on a position of the driven unit and a driving force applied to the driven unit and calculating a translational shake correction amount based on the estimated shake; and
driving the driven unit of the image stabilization unit based on the translational shake correction amount,
wherein when the driven unit is at a position away from a center of a range of movement of the driven unit, the translational shake correction amount is set to be smaller than that when the driven unit is at the center of the range of movement.

11. The control method according to claim 10,
wherein the calculation step comprises estimating the shake by using a Kalman filter, and when a moving amount of the driven unit is large, the calculation step comprises multiplying the estimated shake by a gain smaller than that when the moving amount of the driven unit is small.

12. The control method according to claim 11,
wherein when movement characteristics of the driven unit is represented by a driving thrust by the driving unit based on a mass and the moving amount of the driven unit, a spring constant, a damping coefficient and a driving signal, the Kalman filter estimates a velocity of the shake by using the moving amount of the driven unit obtained from the image stabilization unit as a state variable and the driving thrust as an input variable, and
wherein a parameter that changes according to the moving amount of the driven unit is at least either one of the spring constant or the damping coefficient, and the calculation step compensates for a change in at least either one of the spring constant or the damping coefficient when the velocity of the shake is estimated.

13. The control method according to claim 12,
wherein the spring constant changes according to the moving amount of the driven unit,
wherein the calculation step comprising estimating the velocity of the translational shake by using the spring constant corresponding to the moving amount.

14. The control method according to claim 12,
wherein the spring constant changes according to the moving amount of the driven unit, and
wherein the calculation step comprises holding a difference between a reference value of the spring constant and the spring constant that changes according to the moving amount of the driven unit and estimating the velocity of the translational shake by using the driving thrust compensated with the difference.

15. The control method according to claim 12,
wherein the damping coefficient changes according to the moving amount of the driven unit,
wherein the calculation step comprises estimating the velocity of the translational shake by using the damping coefficient corresponding to the moving amount.

16. The control method according to claim 12,
wherein the damping coefficient changes according to the moving amount of the driven unit,
wherein the calculation step comprises estimating the velocity of the translational shake by using the driving thrust compensated with a difference, held in advance, between a reference value of the damping coefficient and the damping coefficient that changes according to the moving amount of the driven unit.

* * * * *